United States Patent
Guillaume

[11] 3,977,187
[45] Aug. 31, 1976

[54] DEVICE FOR DETECTING EFFECTIVE OPERATION OF THE REHEAT SYSTEM OF A TURBO-JET ENGINE

[75] Inventor: Roger Guillaume, Brie-Comte-Robert, France

[73] Assignee: Societe Nationale d'Etude et de Construction de Moteurs d'Aviation, Paris, France

[22] Filed: Apr. 17, 1974

[21] Appl. No.: 461,692

[30] Foreign Application Priority Data
Apr. 26, 1973  France ............................. 73.15139

[52] U.S. Cl. .................................. 60/233; 60/241; 60/261; 73/407 PR; 137/824; 137/833; 60/243
[51] Int. Cl.² ......................................... F02K 3/08
[58] Field of Search .......... 73/407 PR; 60/236, 241, 60/243, 261, 233, 242; 137/822, 823, 824, 833

[56] References Cited
UNITED STATES PATENTS

| | | | |
|---|---|---|---|
| 2,629,569 | 2/1953 | Andrews | 60/242 X |
| 2,677,233 | 5/1954 | Jordan | 60/242 |
| 2,724,947 | 11/1955 | Meyer | 60/242 |
| 2,892,307 | 6/1959 | Mangan | 60/243 X |
| 2,929,202 | 3/1960 | Mangan | 60/243 X |
| 2,938,331 | 5/1960 | Baker | 60/261 X |
| 3,032,983 | 5/1962 | Embree | 60/243 X |
| 3,046,790 | 7/1962 | Bauer | 73/407 PR |
| 3,342,196 | 9/1967 | Przybylko | 60/39.28 R |
| 3,390,528 | 7/1968 | Howell | 60/243 |
| 3,392,739 | 7/1968 | Taplin | 60/39.28 R |
| 3,566,900 | 3/1971 | Black | 60/39.28 R |
| 3,611,282 | 10/1971 | Hill | 73/407 PR |
| 3,625,063 | 12/1971 | Urbanosky | 73/407 PR |

*Primary Examiner*—Clarence R. Gordon
*Attorney, Agent, or Firm*—Watson, Cole, Grindle & Watson

[57] ABSTRACT

In order to detect effective operation of the reheat system of a turbo-jet engine, a detection device is provided which is adapted to produce an output signal when such effective operation is sensed. The detection device includes means for sensing the pressure of the gas flow in the engine at a pair of preselected positions and feeding signals to processing means related to the pressures so sensed. When there is a preselected difference between the two signals, the output signal referred to above is generated.

2 Claims, 12 Drawing Figures

DEVICE FOR DETECTING EFFECTIVE OPERATION OF THE REHEAT SYSTEM OF A TURBO-JET ENGINE

This invention relates to turbo-jet engines of the kind comprising an expansion turbine, a reheat duct (also known as an after-burner) and a propulsion nozzle, successively traversed by a gas flow, and is concerned with a method and device which permit detection of effective operation of the reheat system of this kind of turbo-jet engine.

Detection of effective operation or ignition of the reheat system poses a number of difficult problems which have never yet been resolved in an entirely satisfactory way. In this respect, various devices have previously been proposed, amongst which it is worth mentioning in particular optical fibre detection devices, detection devices using optical sighting and photo-electric cells, and detection devices using ionisation probes. Detection devices are also known which are responsive to transitory variations in a pressure signal produced by operation of the reheat system. In this context, experiments have already been carried out on devices in which a transitory pressure variation (a pressure wave), produced in the turbo-jet engine (for example in the reheat duct) at the instant of ignition of the reheat system, is utilised.

These known devices all have serious drawbacks. Optical fibre detection devices give rise to serious problems of signal drift in a hot environment. Detection devices utilising a photo-electric cell are relatively complex and fragile. Ionisation probes deteriorate rapidly. Devices which detect transitory variations in a pressure signal (a pressure wave), at any rate those known thus far, are such that it is difficult to effect discrimination between the pressure variations which are due to effective ignition of the reheat system, and those which are caused by variations in some other operating parameter of the turbo-jet engine, for example by movement of the pilot-operated throttle.

An object of the present invention is to provide a method for detecting effective operation of the reheat system, and a device which is both simple, robust and reliable, and in which the aforesaid drawbacks are substantially reduced or avoided.

The method in accordance with the invention comprises the steps of generating a first signal as a function of the static or total pressure of the gas flow in the reheat duct, generating a second signal as a function of the static pressure of the gas flow in the propulsion nozzle, and processing said first and second signals to compare them and issue an output signal only when the difference between said first and second signals exceeds a predetermined threshold level, said output signal constituting a detection signal corresponding to effective operation of the reheat system.

The detection device used therefor comprises first means for ascertaining the static pressure or the total pressure of the gas flow at a given point in the reheat duct and for generating a first signal as a function of said static or total pressure; second means for ascertaining the static pressure of the gas flow at a given point in the nozzle and for generating a second signal as a function of said static pressure; and means for processing said first and second signals, which are designed to produce an output signal if the difference between said first and second signals exceeds a predetermined threshold level (which may, furthermore, be very low), said output signal constituting a signal corresponding to detection of effective operation of the reheat system.

The first and second signals referred to above may be fluid pressure signals or electrical signals, in respect of which various methods of processing will be described hereinafter.

In accordance with a preferred embodiment, the said first means are designed to ascertain the static pressure or total pressure of the gas flow at a point located in the upstream zone of the reheat duct, for example at a point located upstream of the flame holder normally installed in said zone. As far as the said second means are concerned, these will advantageously be designed to ascertain the static pressure of the gas flow at the nozzle throat.

As will be seen later, the output signal produced by a detection device in accordance with the invention is a permanent signal which is produced as long as the reheat phase lasts, and is not a transitory signal as would be the case with the pressure wave utilised in certain of the known devices. It will be observed, furthermore, that the various pressures mentioned hereinbefore are in any event already measured in the majority of turbo-jet engines, so that the device in accordance with the invention does not involve the use of a large number of additional components.

The invention will now be described by way of example with reference to the accompanying drawings, in which:

FIG. 1 is a diagrammatic illustration of a turbo-jet engine equipped with a device in accordance with the invention of detecting effective operation of the reheat system, FIGS. 2 to 7 illustrate schematically different embodiments of a detection device in accordance with the invention, FIG. 8 is a detection diagram associated with FIG. 6, and FIGS. 9 to 12 are experimental graphs illustrating the principle upon which detection of effective operation of the reheat system is based.

In FIG. 1 there is shown a highly schematic illustration of a turbo-jet engine, for example a twin-spool engine, comprising a low-pressure compressor 1, a high-pressure compressor 2, a main combustion chamber 3, a high-pressure expansion turbine 4, a low-pressure expansion turbine 5, a reheat or after-burner duct 6, and a convergent-divergent propulsion nozzle 7, traversed in succession by a gas flow.

The low-pressure compressor 1 and the low-pressure turbine 5 together constitute a low-pressure system rotating at a speed $N_1$. Similarly, the high-pressure compressor 2 and the high-pressure turbine 4 constitute together a high-pressure system rotating at a speed $N_2$. The reheat duct 6 is equipped with at least one flame-holder 8 in the wake of which the fuel injected into said duct can ignite. The nozzle 7 comprises flaps 9 which are used to regulate the cross-sectional area $s$ of the nozzle throat 10. In the following description:

$T_2$ designates the total temperature of the air at the intake of the low-pressure compressor 1;

$N_1/\sqrt{T_2}$ designates the reduced speed of the low-pressure system 1 – 5;

$N_2/\sqrt{T_2}$ designates the reduced speed of the high-pressure system 2 – 4;

$P_4$ designates the pressure of the air flow at the exit of the high-pressure compressor 2;

$P_7$ designates the pressure of the gas flow at the exit of the low-pressure turbine 5;

Q designates the fuel flow for the main combustion chamber 3; and $Q_r$ designates the fuel flow for the reheat duct.

A governor 11, equipped with a pilot-operated throttle lever 12, ensures correct operation of the turbo-jet engine. The governor is supplied with input signals $N_1$, $N_2$, $T_2$, $P_4$ and $P_7$.

In so called "dry" operation (that is to say without reheat), the fuel flow Q and the cross-sectional area $s$ of the nozzle throat, are programmed in accordance with the angular position $\alpha$ of the pilot-operated throttle 12, so that, with each angular position $\alpha$ of said throttle, there corresponds, in accordance with predetermined rules, a value $N_1/\sqrt{T_2}$ of the reduced speed of the low-pressure system, and a valve $N_2/\sqrt{T_2}$ of the reduced speed of the high-pressure system, as well as a value $P_7$ for the pressure of the gases at the exit from the low-pressure turbine, this corresponding itself to a certain in-flight thrust.

In reheat operation, it is necessary that the injection of fuel into the reheat duct 6 should not disturb the operation of the remainder of the engine, that is to say should not give rise either to an increase in the temperature of the gas flow entering the reheat duct, or to variations in the speeds of rotation $N_1$ and $N_2$. However, the injection of reheat fuel has the instantaneous effect, other things being equal, of increasing the pressure $P_7$, and thus unbalancing the ratio $P_4/P_7$ so that consequently it varies the speeds $N_1$ and $N_2$. This imbalance is processed by the governor 11 which supplies an opening command to the flaps 9 in order to readjust the cross-sectional area $s$ of the nozzle throat, to the new operating conditions and thus to reestablish the pressure $P_7$ at its initial "dry" operating level under full load. The pressure level $P_7$ is therefore not effected by whether or not the reheat system is operating.

In the following, $P_x$ will be used to designate the static pressure and $P'_x$ the total pressure of the gas flow $\phi$ at a given point in the reheat duct 6. This point can advantageously be chosen in the upstream zone of said duct, preferably upstream of the flame holder, so that $P_x = P_7$. Similarly, the reference $P_y$ will be used to designate the static pressure in the gas flow at a given point in the nozzle 7, for example at the throat 10 thereof.

As will now be explained, knowing the two pressures $P_x$ (or $P'_x$) and $P_y$, it is possible, in accordance with the invention, to detect effective operation of the reheat system. To this end let us consider FIGS. 9 to 11. Systematic measurements have been carried out by the applicants, on the one hand in "dry" operation, and on the other in reheat operation, for various values of $N_1$, $N_2$, M (Mach number), Z (altitude of flight) and $Q_r$. For each "dry" operating point defined by a value of $N_1$, $N_2$, M and Z, the respective levels of $P_x$, $P'_x$ and $P_y$ were measured, making it possible to plot graphs $P_y = f(P_x)$ (graph F in FIG. 9) and $P_y = f'(P'_x)$ (graph F' in FIG. 10). Similarly, for each reheat operating point, defined by a value of $N_1$ $N_2$ M, Z and $Q_r$, the corresponding levels of $P_x$, $P'_x$ and $P_y$ were measured and subsequently used to plot the graphs $P_y = g(P_x)$ (graph G in FIG. 9) and $P_y = g'(P'_x)$ (graph G' in FIG. 10). It is evident that graphs F, F', G and G' are substantially straight lines.

Figure 10:
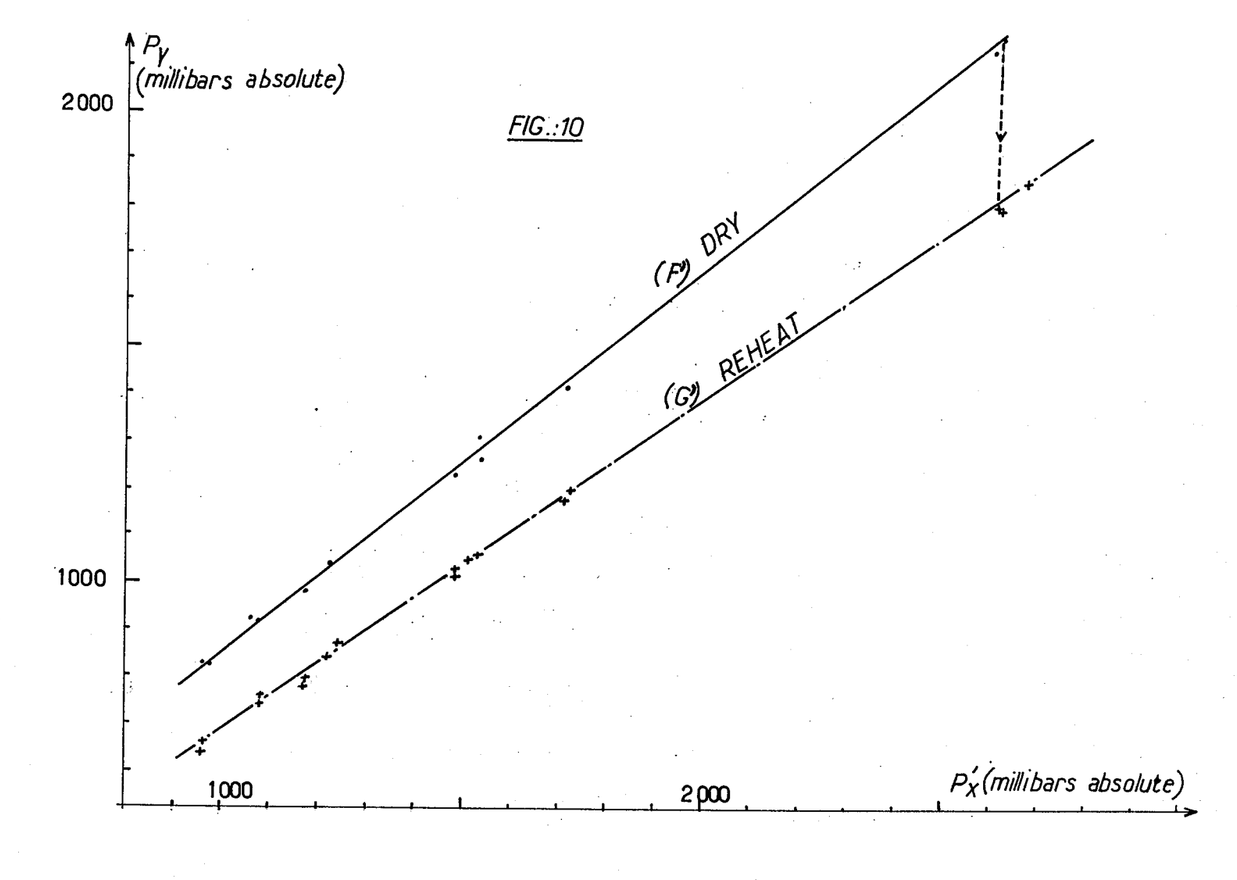

Examining FIGS. 9 and 10, it will be seen that the two straight lines F and G (or F' and G') which respectively characterise "dry" operation and reheat operation, are clearly separated from one another. However, as explained hereinbefore, in normal operation of the turbojet engine, the pressure level $P_7$ is not affected by whether or not the reheat is being used. The same applies to the pressures $P_x$ and $P'_x$. Transfer from the "dry" operating condition to reheat operation, this being translated in the graph by moving the straight line F to the position of the straight line G (or the straight line F' to the position of the straight line G'), thus takes place at a substantially constant $P_x$ (or $P'_x$ value, as indicated in FIGS. 9 and 10 by the vertical broken line. For each value of $P_x$ (or $P'_x$), there is thus a permanent interval between the level of $P_y$ in "dry" operation and the level of $P_y$ in reheat operation. This phenomenon is explained by the fact that there is an increase in the temperature of the gas flow $\phi$ in the reheat duct 6 in reheat operation, consequently an increase in the velocity of discharge of the flow through the nozzle 7 and therefore a reduction, at this location, in the static pressure $P_6$ of the flow.

It will now be demonstrated how this difference in level can be utilised to detect effective operation of the reheat system. For each value of $P_x$, using the graph F of FIG. 9, there has been found the difference ($P_x - P_y$), and a corresponding graph $(P_x - P_y) = h(P_x)$ (graph H in FIG. 11), characteristic of "dry" operation of the turbo-jet engine, has been plotted. Similarly, using the graph G of FIG. 9, a graph $(P_x - P_y) = k(P_x)$ (graph K in FIG. 11), characteristic of the reheat operation of the turbo-jet engine, has been plotted. The graphs H and K are likewise substantially straight lines.

Figure 11:
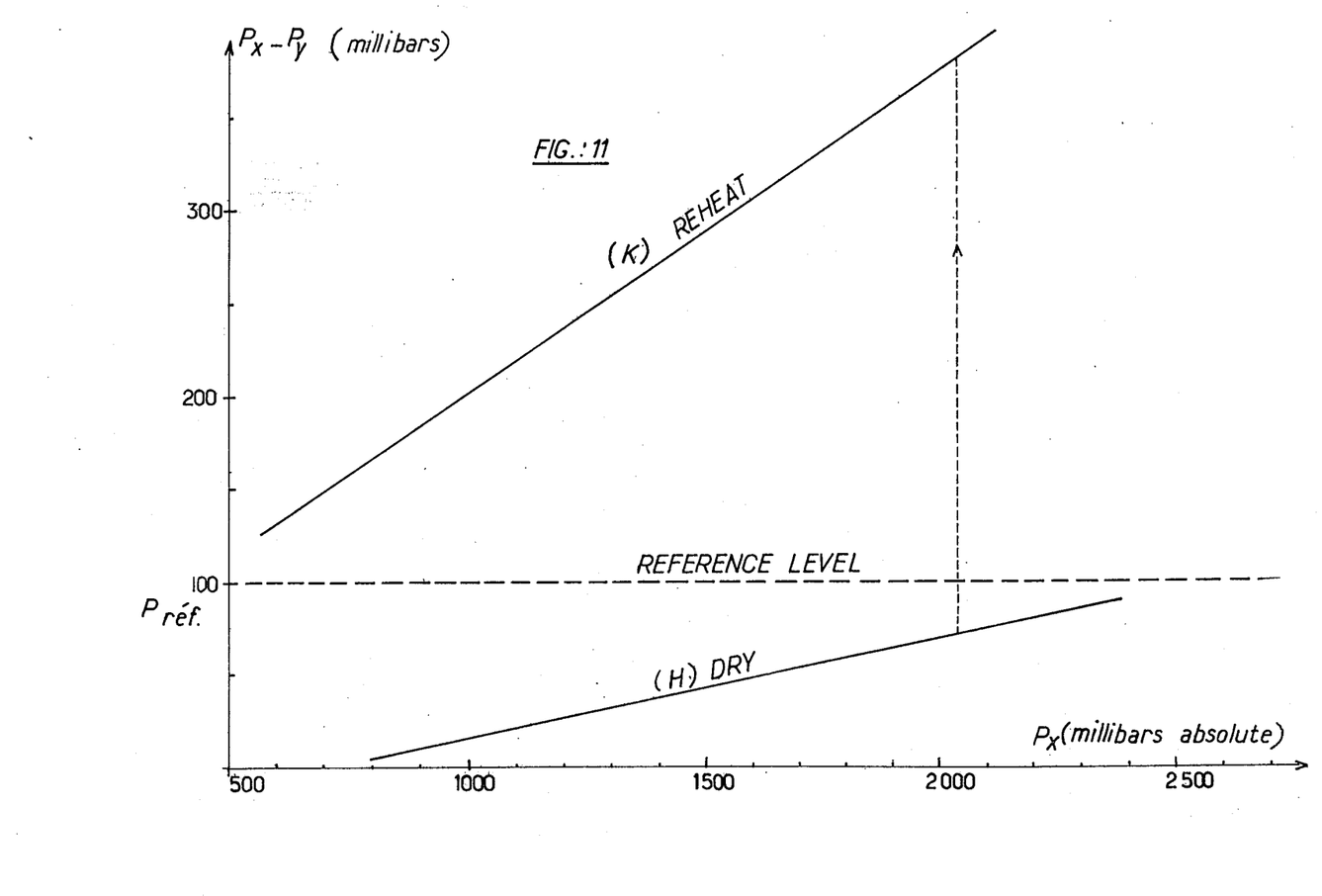

Considering FIG. 11, it will be observed that the difference ($P_x - P_y$), is always greater than a certain level $P_{ref}$, for example 100 mb. when the turbo-jet engine is operating on reheat, and that by contrast it is always lower than said same level when the turbo-jet engine is operating "dry". Thus, in order to detect reliably that the turbo-jet engine is effectively operating on reheat, it is merely necessary to determine the difference ($P_x - P_y$) and to check whether it is higher than the aforesaid level, this constituting a reference level characteristic of the turbo-jet engine. The same result will be obtained using similar graphs, not shown, $(P'_x - P_y) = h'(P'_x)$ and $(P'_x - P_y) = k'(P'_x)$ obtained from the graphs F' and G' of FIG. 10.

FIG. 1 illustrates diagrammatically a detection device in accordance with the invention, which employs the detection principle just explained.

This device comprises first means 20 for ascertaining the static pressure $P_x$ or the total pressure $P'_x$ of the gas flow $\phi$ at a given point in the reheat duct 5 (preferably upstream of the flame holder 8), and for producing a first signal $x$ which is a function of said static or total pressure. It likewise comprises second means for ascertaining the static pressure $P_y$ of the gas flow $\phi$ at a given point in the nozzle 7 (preferably at the throat 10 of the latter) and for generating a second signal $y$ which is a function of said static pressure. Finally, it comprises processing means 22 for processing the signals $x$ and $y$, processing means 22 being designed to produce an output signal $z$ when the difference $(x - y)$ between the signals $x$ and $y$ exceeds a predetermined threshold. The output signal $z$ constitutes a signal detecting effective operation of the reheat system and it can be utilised, for example, to operate an electrical contact-breaker 23 which controls the lighting of a lamp 24.

Considering FIGS. 2 to 8 now, various embodiments of a detection device in accordance with the invention will be described. FIG. 2 illustrates a first embodiment based upon the use of electrical signals. A first pick-up 20 permits one to generate a first signal voltage $V_x$ which is a function of the pressure $P_x$. A second pick-up 21 permits production of a second signal voltage $P_y$ which is a function of the pressure $P_y$. The signals of voltages $V_x$ and $V_y$ are processed through an electronic device 22 which comprises two subtractors 25 and 26 such as operational amplifiers. The subtractor device 25 enables the production, from the signal voltages $V_x$ and $V_y$, of a signal voltage $(V_x - V_y)$. The subtractor device 26 makes it possible, from the signal voltage $(V_x - V_y)$ and a reference signal $V_{ref.}$ (which corresponds to the reference level $P_{ref.}$ referred to earlier), to produce a resultant signal voltage $V_s = (V_x - V_y) - V_{ref.}$ which makes it possible to supply the lamp 24 via an amplifier 27.

In "dry" operation; $(V_x - U_y) < V_{ref.}$. Therefore $V_z < 0$. The lamp 24 remains extinguished.

In reheat operation; $(V_x - V_y) < V_{ref.}$. Therefore $V_z > 0$. The lamp 24 is lit. The signal voltage $V_z$, if it is positive, thus constitutes an output signal whose presence characterises reheat operation.

FIG. 3 illustrates a second embodiment of the invention, bases upon the use of fluid pressure signals in a pneumatic processing device 22 comprising a mobile element 30, such as a diaphragm, biased downwards (in the figure) by a pre-load force, produced, for example, by a tension spring 31. The diaphragm 30 separates a first chamber 32, supplied with the pressure signal $P_x$ (or a fluid pressure signal which is a function of the pressure $P_x$), from a second chamber 33 receiving the pressure signal $P_y$ (or a fluid pressure signal which is a function of the pressure $P_y$). The diaphragm 30 is fixed to a plate 34 designed to cooperate with the actuator of an electrical contact-breaker 35 controlling operation of the lamp 24.

The mobile diaphragm 30 is therefore urged in one direction by a force which is a function of the pressure signal $P_x$, and, in the other direction, by a force which is a function of the pressure signal $P_y$ and by the bias force exerted by the tension spring 31. This bias force determines a reference threshold corresponding to the reference level $P_{ref.}$ referred to earlier (see FIG. 11).

In "dry" operation, $(P_x - P_y) < P_{ref.}$. Hence $P_x < P_y + P_{ref.}$. The diaphragm 30 is displaced downwards (in the figure). The lamp 24 remains extinguished. In reheat operation, $(P_x - P_y) > P_{ref.}$. Hence $P_x > P_y + P_{ref.}$. The diaphragm 30 is displaced upwards (in the figure) against the action of the bias force hereinbefore referred to and operates the contact-breaker 35. The lamp 24 is lit. This displacement on the part of the diaphragm in the upward direction thus constitutes an output signal characteristic of — reheat operation.

An adjustable stop 36 makes it possible to limit upward displacement of the diaphragm 30 to the correct value for operation of the contact breaker 35, in order to prevent the diaphragm from damaging itself.

FIG. 4 illustrates a variant of the embodiment shown in FIG. 3, in which the mobile element is constituted by a capsule or bellows 40 the interior of which receives the pressure signal $P_x$ (or a pressure signal which is a function of the pressure $P_x$) and the exterior of which is supplied with the pressure $P_y$ (or a pressure signal which is a function of the pressure $P_y$). The bellows is biased in the contraction direction by a given preload force, for example, by means of a tension spring 41 installed inside the bellows. At its free end, the bellows 40 is equipped with a finger 42 designed to co-operate with the contact-breaker 25.

In "dry" operation, the bellows 40 is contracted. The lamp 24 remains extinguished. In reheat operation, the bellows 40 expands against the action of the spring 41 and operates the contact-breaker 35. The lamp 24 is then lit.

FIG. 5 illustrates another variant of the embodiments shown in FIGS. 3 and 4, in accordance with which the mobile element is constituted by a spool 50 supplied at one of its faces with the pressure signal $P_x$ (or a pressure signal which is a function of the pressure $P_x$) and, at the other of its faces with a pressure signal $P_y$ (or a pressure signal which is a function of the pressure $P_y$). The spool 50, is, furthermore, biased in the upward direction (considering the figure) and is provided for example, with a compression spring 51. It cooperates through the intermediary of an articulated lever 52 with the contact-breaker 35.

In "dry" operation, the spool 50 is lifted upwards (in the figure). The lamp 24 remains extinguished. In reheat operation, the spool 50 is displaced downwards (in the figure) against the action of the spring 51 and operates the contact-breaker 35. The lamp 24 is then lit.

FIG. 6 illustrates a further embodiment of the invention based upon the use of fluid pressure signals in a pneumatic processing device 22 comprising a monostable fluidic trigger stage 60. The trigger stage 60 comprises a power circuit made up of an input passage 61, from which branch two output passages 62, 63. The power circuit has a relatively high pressure power fluid flow, taken for example from the output of the high-pressure compressor 2, the pressure of said fluid then being equal to $P_4$. The structure of the trigger stage is strongly asymmetrical. To this end, in the left-hand channel it has a slightly inclined wall 62a and, in the right-hand channel, a steeply inclined wall 63a (inclined that is in relation to the axis of the input passage 61). The result is that the power fluid flow tends to preferentially adhere, due to the Coanda effect, to the wall 62a of the left-hand channel which leads to the output passage 62.

The trigger stage 60 likewise comprises a control circuit consisting of two control passages 64, 65 which open transversely into the power circuit in the zone where the output channels 62, 63 branch off. The control passage 64 receives the pressure signal $P_x$ (or a pressure signal which is a function of the pressure $P_x$), whilst the control passage 65 receives the pressure signal $P_y$ (or a pressure signal which is a function of the pressure $P_y$). The transverse fluid jets passing through the control passages 64, 65 act in a manner known per se upon the orientation of the power fluid flow which is deflected into one or the other of the two output passages 62, 63 depending upon the respective levels of the pressures $P_x$ and $P_y$.

The trigger stage 60 also comprises two vents 66, 67, which are designed to facilitate the exchange of momentum between the control fluid jets and the power fluid flow, at the instant of switching of said flow from one orientation to the other. These vents communicate, for example, with the ambient atmosphere. The two output passages 62, 63 communicate respectively with two chambers 68, 69 separated from one another by a movable diaphragm 70. When it is displaced in the desired direction (towards the right in the figure) this latter operates the contact-breaker 35 which controls lighting of the lamp 24.

In "dry" operation, the condition $(P_x - P_y) < P_{ref}$ holds (see FIG. 11). The pressures $P_x$ and $P_y$ are then very nearly the same as each other so that, in view of the asymmetric structure of the trigger stage, the power fluid flow continues to adhere to the wall 62a of the left-hand channel and leaves through the output passage 62. The lamp 24 remains extinguished.

In reheat operation, the condition $(P_x - P_y) > P_{ref}$ holds. The pressure $P_x$ is then very much higher than the pressure $P_y$ and is sufficient to produce switching of the power fluid flow. The latter therefore adheres to the wall 63a of the right-hand channel and exits through the output passage 63. It thus displaces the diaphragm 70 which operates the contact-breaker 35. The lamp 24 is lit. The power fluid flow leaving through the output passage 63 thus constitutes an output signal which characterises reheat operation. As soon as reheat ceases, the jet moves back to adhere to the left-hand wall and the lamp 24 is extinguished.

Switching of the power fluid flow from the passage 62 to the passage 63 only occurs if the difference $(P_x - P_y)$ exceeds a relatively high threshold defined by the respective inclinations of the walls 62a and 63a. By the appropriate choice of the angles of inclination of these walls, it is thus possible to arrange that switching occurs at the instant at which $(P_x - P_y) > P_{ref}$. In FIG. 8, it has been assumed that the reference level $P_{ref}$, defining the switching threshold, is equal to 100 mb. FIG. 8 likewise shows that the fluidic trigger stage 60 operates on a hysteresis cycle with a first switching threshold (100 mb) in the "dry-reheat" direction and a second, slightly lower switching threshold (for example 80 mb) in the "reheat-dry" operation, this promoting a clean response in both directions.

FIG. 7 illustrates a variant of the embodiment shown in FIG. 6, in accordance with which a fluidic trigger stage 60 operating on the principle of the wellknown SCHMITT trigger is used. This trigger stage, unlike the one described earlier, has a structure 62a - 63a of substantially symmetrical kind which, consequently, defines a very low, in fact virtually zero, switching threshold.

As before, the control passage 65 is supplied with the pressure signal $P_y$. By contrast, the control passage 64 is supplied not with the pressure signal $P_x$ this time, but with a pressure signal $P_p < P_x$ which we will refer to hereinafter as the "bias pressure". The pressure signal $P_p$ is produced by means of an expansion device comprising a chamber 71 which, through the medium of a first restriction 72, communicates with a space 74 in which the pressure $P_x$ prevails and, through the medium of a second restriction 73, communicates with a low pressure space $P_o$ (for example at the pressure of the surround atmosphere). This bias pressure is thus proportional to the pressure $P_x$, and it is selected as a function of the flight conditions.

By suitable choice of the characteristics of the pressure-reducing device 71, 72, 73, it is possible to arrange that under all conditions normally encountered, the pressure $P_p$ is sufficiently low and close to the pressure $P_y$ for the difference $(P_p - P_y)$ always to be negative in "dry" operation and always to be positive in reheat operation.

Figure 12:
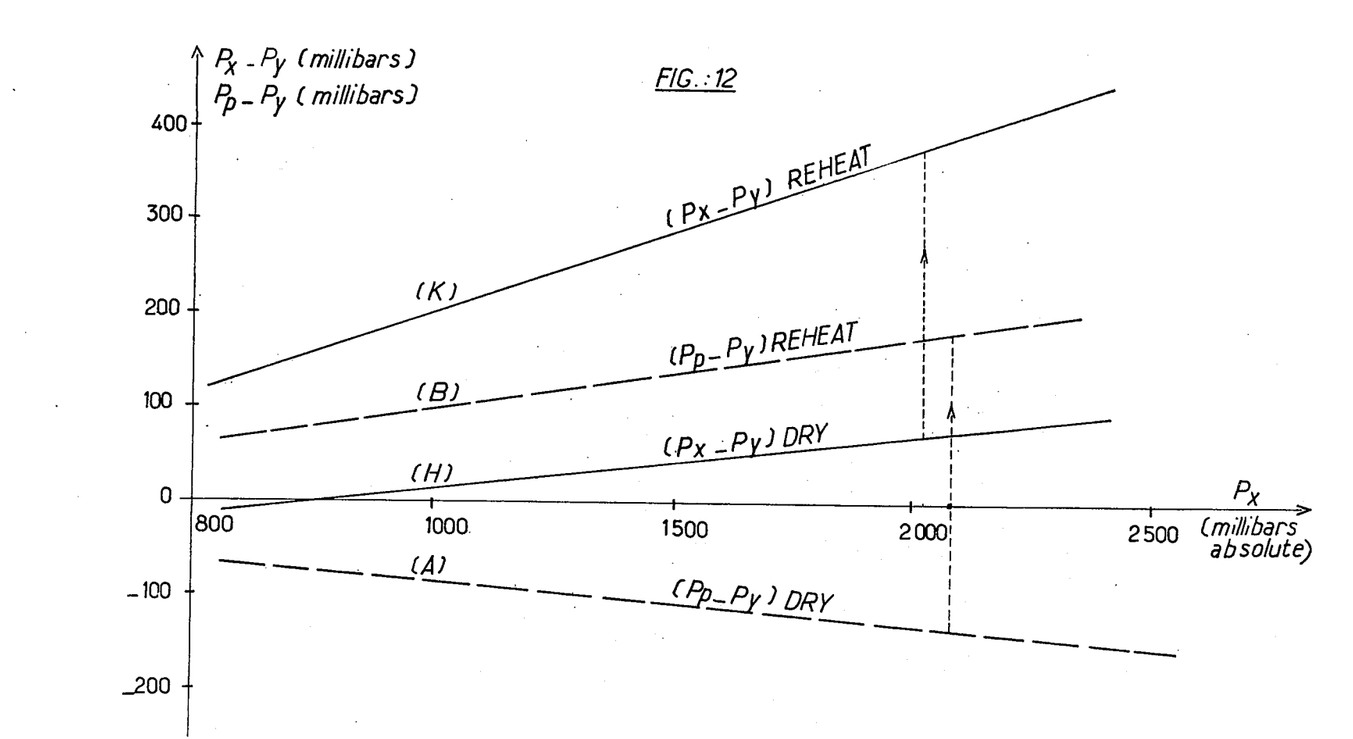

In FIG. 12, the graph $(P_p - P_y) = a (P_x)$ (graph A), characteristic of "dry" operation of the turbo-jet engine, has been plotted, and the graph $(P_p - P_y) = b (P_x)$ (graph B), characteristic of reheat operation thereof, has also been plotted. Also, by way of comparison, in this same figure the graphs H and K already shown in FIG. 11 have been repeated. It will be seen that the graph A is throughout located below the straight ordinate line $(P_p - P_y) = 0$, whilst the graph B is throughout situated above it.

The SCHMITT trigger shown in FIG. 7, with the low or zero switching threshold, makes it possible to detect the transfer from "dry" to reheat operation. In "dry" operation, $(P_p - P_y) < 0$, therefore $P_p < P_y$. The power fluid fluid adheres to the wall 62a and leaves through the output 62. The lamp 24 remains extinguished. In reheat operation, $(P_p - P_y) > 0$, therefore $P_p > P_y$. The power fluid flow adheres to the wall 63a and leaves through the output 63. It thus displaces the diaphragm 70 which operates the contact-breaker 35 and the lamp 24 is lit.

It will be obseved, furthermore, that the vents 66, 67 open into the interior space the sppace 74 where the pressure $P_x$ prevails. Since the pressures $P_x$, $P_y$ and $P_p$ are all less than the pressure of the power fluid flow which passes through the power circuit 61, 62, 63, the vents 66, 67 and the control passages 64, 65 are operating in a low pressure state in relation to said power fluid flow. This arrangement, which does not correspond to the normal operation of a SCHMITT trigger, has the advantage of creating an exhaust effect which promotes self-cleaning of the circuits of the trigger stage, removing impurities left behind by oil vapour, particles of carbon etc. from the turbo-jet engine.

All the devices described can be adapted to a mode of detection in which one of the parameters utilised would, instead of the static pressure $P_x$, be the total pressure $P'_x$ of the gas flow passing through the reheat duct 6 of the turbo-jet engine.

I claim:
1. In a turbojet engine having a turbine connected through a reheat duct equipped with a reheat system to a jet propulsion nozzle having a throat area of minimum cross-section, a detection device for informing whether or not said reheat system is actually in operation, comprising:
   means for generating a first signal as a function of the gas flow pressure in said reheat duct,
   means for generating a second signal as a function of the static pressure at said throat area minimum cross-section, and
   differential signal sensing means having two inputs to which said first signal and said second signal are respectively applied, said differential signal sensing means being responsive to excess over a predetermined threshold value of the difference between said first and second signals, to issue an output signal materializing actual operation of said reheat system.
2. A detection device as claimed in claim 1, wherein said differential signal sensing means comprise a movable member urged in one direction by a force which is a function of said first signal, and in the opposite direction both by a force which is a function of said second signal and by a reference threshold force, said output signal being manifest upon displacement of said movable member in said one direction against said reference threshold force.

* * * * *